United States Patent [19]
Rossi

[11] Patent Number: 5,569,022
[45] Date of Patent: Oct. 29, 1996

[54] SELF-UNBLOCKING MOTOR-DRIVEN PUMP HAVING LAST MOTION SHAFT COUPLING

[75] Inventor: Luigi Rossi, Oderzo, Italy

[73] Assignee: Sole S.p.A., Pordenone, Italy

[21] Appl. No.: 303,952

[22] Filed: Sep. 9, 1994

[30] Foreign Application Priority Data

Sep. 17, 1993 [IT] Italy .................... PN93 00061

[51] Int. Cl.⁶ .................................................... F04B 17/03
[52] U.S. Cl. .................. 417/319; 417/325; 417/423.7; 310/78; 310/92; 415/124.2; 464/160
[58] Field of Search .................................... 417/319, 325, 417/423.6, 423.7, 424.2; 310/78, 92; 415/124.2; 464/69, 89, 160

[56] References Cited

U.S. PATENT DOCUMENTS

| | | | |
|---|---|---|---|
| 1,550,779 | 8/1925 | Carpenter | 464/160 |
| 3,146,756 | 9/1964 | Shimanckas | 464/160 |
| 4,750,872 | 6/1988 | Palliser | 464/160 |
| 4,803,855 | 2/1989 | Kennedy | 464/160 |
| 4,861,240 | 8/1989 | Marioni et al. | 464/160 |

FOREIGN PATENT DOCUMENTS

| | | | |
|---|---|---|---|
| 897668 | 4/1943 | France | 417/319 |
| 2102072 | 1/1983 | United Kingdom | 417/325 |

Primary Examiner—Timothy S. Thorpe
Assistant Examiner—Roland G. McAndrews, Jr.
Attorney, Agent, or Firm—Pearne, Gordon, McCoy & Granger

[57] ABSTRACT

A pump driven by an electric motor includes a stator, a rotor cooperating with the stator, a rotating drive-shaft associated to the rotor, a hermetically sealed chamber, and a disk wheel within the sealed chamber and joined to the drive-shaft. The sealed chamber is sealed by a first ring gasket around the drive-shaft and in the sealed chamber and a second ring gasket fixed to the drive-shaft and against the first ring gasket. The first and second ring gaskets are pressure coupled to each other. At start-up of the motor, the rotor or the stator is allowed to turn freely for a certain initial arc without torque being applied to the coupling so that inertia can be accumulated to overcome resistance of the coupling when the torque is subsequently applied to the coupling.

5 Claims, 5 Drawing Sheets

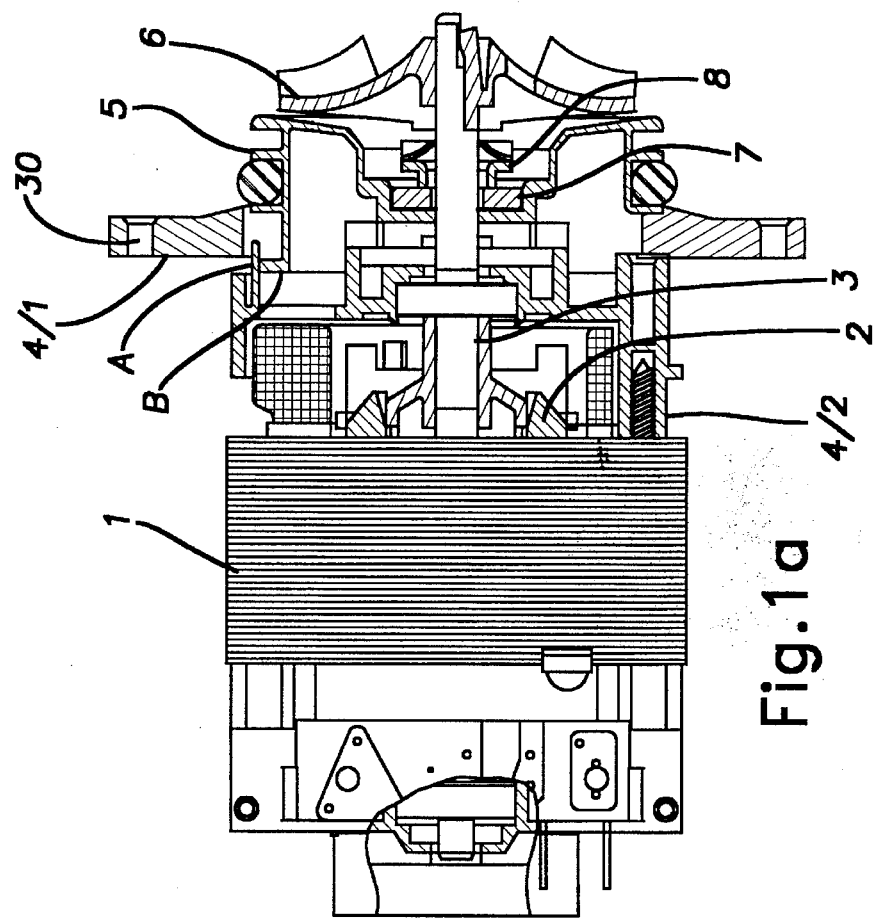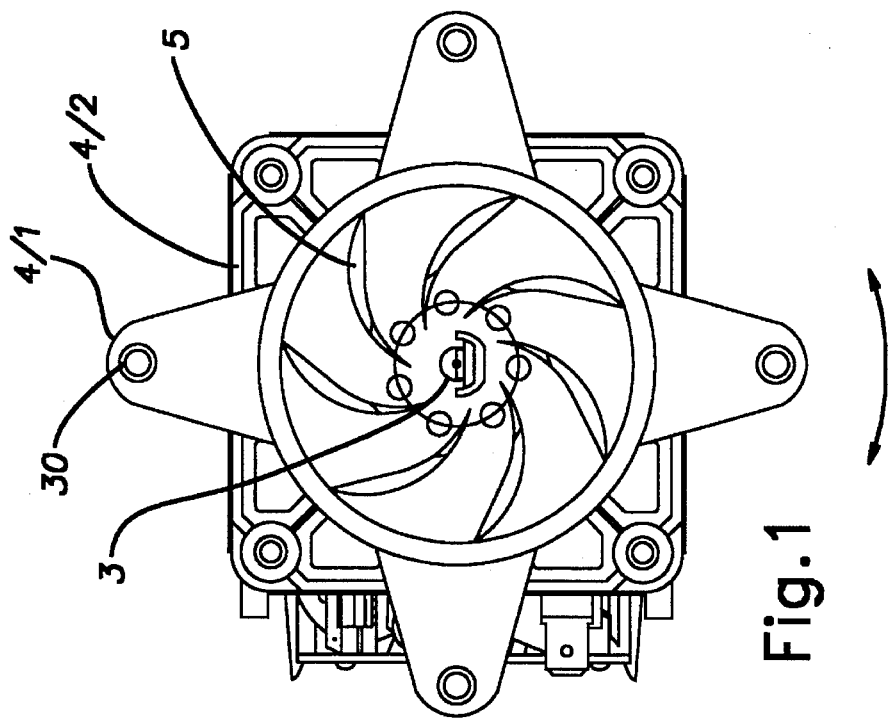

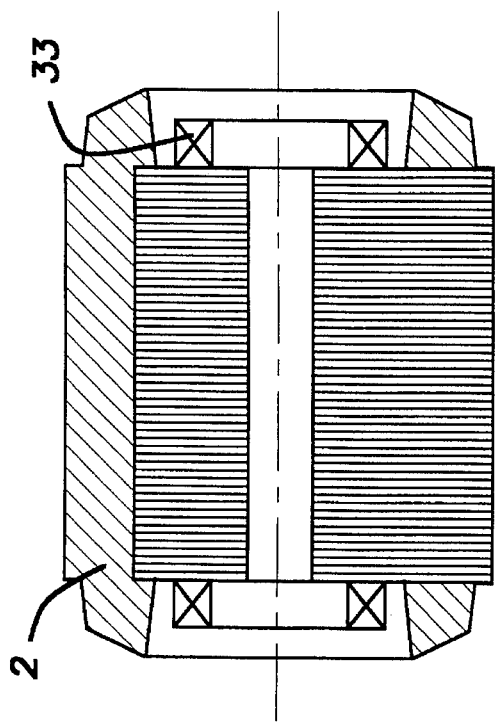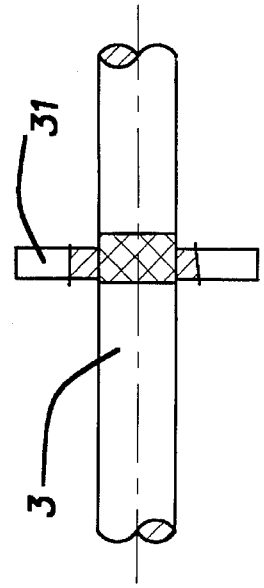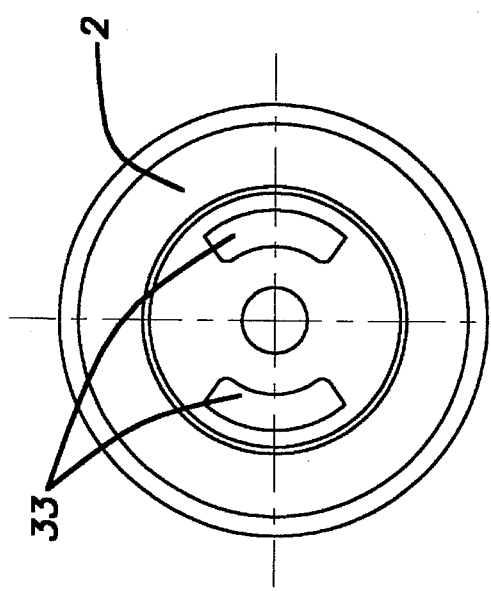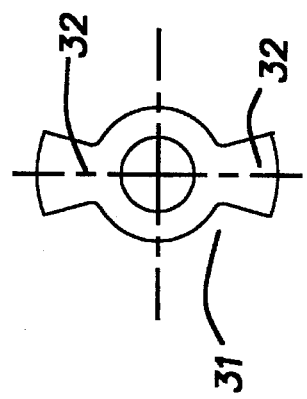

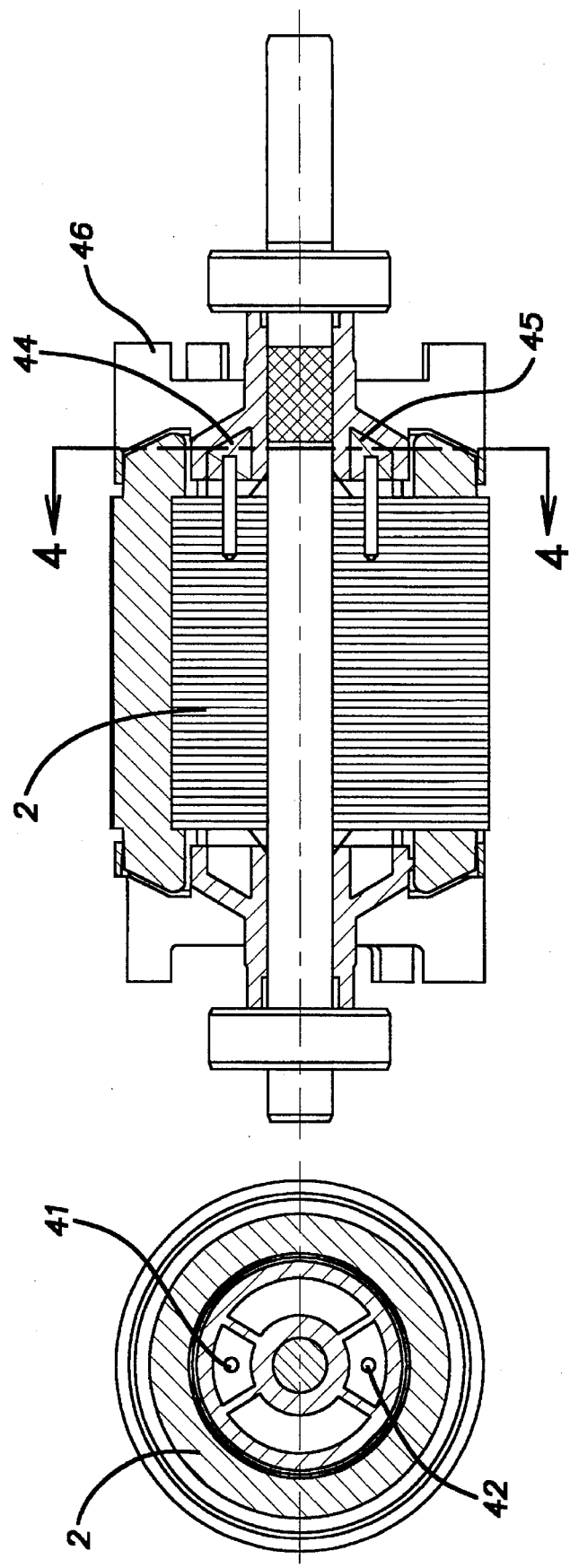

5,569,022

SELF-UNBLOCKING MOTOR-DRIVEN PUMP HAVING LAST MOTION SHAFT COUPLING

BACKGROUND OF THE INVENTION

1. Field of the Invention

The present invention relates to motor-driven pumps having mechanical frontal seals used to move liquids such as in household appliances, heating systems, hydraulic circulation systems in motor vehicles including industrial vehicles, and more specifically, self-unblocking motor driven pumps.

2. Description of Related Art

It is known that it is hard to start motor-driven pumps having frontal seals, especially after having been idle for a period of time. The difficulty in starting is caused by the sticking together of the frontal seals. The frontal seals have two reciprocally sliding and mirror-polished faces that ensure a hermetic seal in a certain place on a motor-driven shaft that rotates a disk wheel on the inside of a sealed chamber full of liquid to be removed. Typically, the frontal seals consist of a fixed gasket and a rotated gasket. The fixed gasket is mounted to a fixed structure of the pump. The fixed gasket has a rigid ring with a central hole through which the drive-shaft passes. The rotated gasket has an elastic element hermetically applied to the shaft and a rigid ring element surrounding the shaft.

The hermetic seal is ensured by abutting surfaces of the two rigid ring elements. These surfaces are flat, parallel, mirror-polished, and pressed together in a direction orthogonal to their common plane.

During operation the surfaces rub but their characteristics of construction and assembly ensure the desired seal. After an idle period, however, for various reasons the surfaces stick together to block rotation of the shaft. The sticking together is mainly due to the deposit of substances such as limestone, detergent, and grease, that are contained in the liquid, a drop in temperature making the substances more viscous, and the fact the two surfaces are pressing against each other. To obviate this almost systematic inconvenience, pump manufacturers must provide extra starting torque of the motor or make it possible for the user to intervene manually. The former solution is practical and feasible but calls for over sizing windings and a starting capacitor which increases manufacturing costs. The latter solution cannot practically be proposed for an entire category of uses because of inaccessibility of the pump or because automatic machines by definition do not allow manual intervention by the user to start them.

It would therefore be desirable, and is an aim of this invention, to achieve a hermetic coupling on a pump's drive-shaft that eliminates the problem described and that is reliable, economical, and easy to install using materials and techniques known in the state of the art.

SUMMARY OF THE INVENTION

The present invention provides a self-unblocking motor-driven pump that is automatically left free to start. The motor is free to start by initially loading a rotor or stator of the motor with minimum mechanical resistance, that is, without any initial resistance caused by sticking of hermetically coupled gaskets that block rotation of motor components. At start-up of the motor, the rotor or the stator is allowed to turn freely for a certain initial arc without torque being applied to the coupled gaskets so that inertia can be accumulated to overcome resistance of the coupled gaskets when the torque is subsequently applied to the coupled gaskets.

The pump begins to operate once the torque is applied to the sticking gaskets and the resistance has been overcome. Any further resistance of the coupled gaskets during operation of the pump should be lower than the operating torque of the motor.

BRIEF DESCRIPTION OF THE DRAWINGS

These and further features of the present invention will be apparent with reference to the following description and drawings, wherein:

FIG. 1 is a front elevational view of a motor-driven pump according to a first embodiment of the present invention;

FIG. 1a is a longitudinal elevational view, in partial cross-section, of the motor-driven pump of FIG. 1;

FIG. 2 is a sectional view taken along line 2—2 of FIG. 2a;

FIGS. 3, 3a, 3b, and 3c are views of a motor-driven pump according to a third embodiment of the invention;

FIG. 4 is a sectional view taken along long line 4—4 of FIG. 4a;

FIG. 4a is a longitudinal elevational view, in cross-section, of a motor-driven pump according to a fourth embodiment of the invention;

FIG. 5 is a sectional view taken along line 5—5 of FIG. 5a; and

DETAILED DESCRIPTION OF THE PREFERRED EMBODIMENT

Figure 2A:
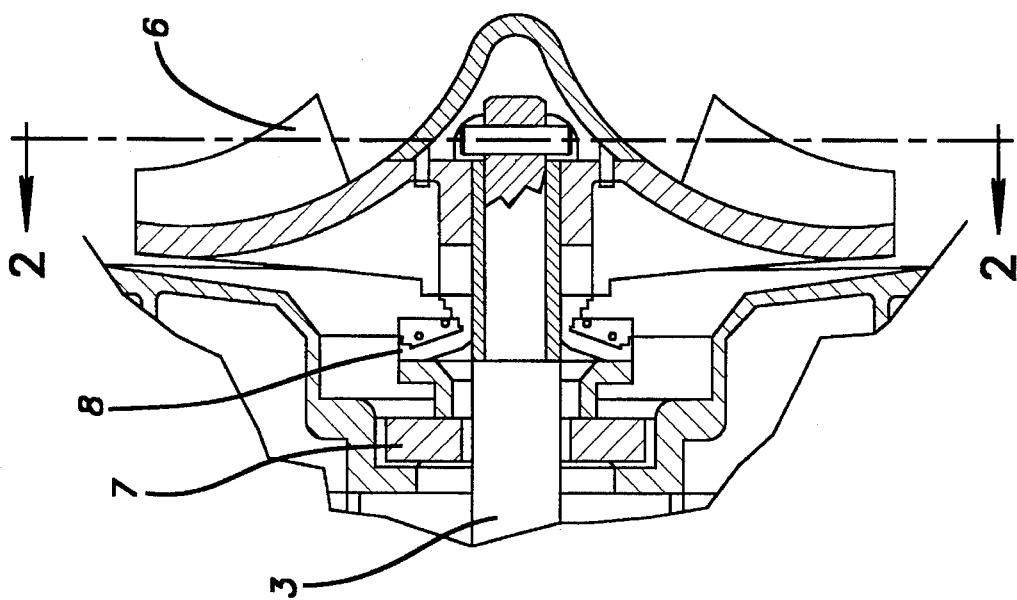
FIG. 2a is a fragmented longitudinal elevational view, in cross-section, of a second embodiment of the invention.

A pump according to a first embodiment of the invention is shown in FIGS. 1 and 1a. The pump has a stator 1, a rotor 2, a drive-shaft 3 to which the rotor is rigidly attached, and a disk wheel 6 which is rotated by the drive-shaft 3. The stator 1 is attached to a frame that is attached in a known manner to other parts of the machine to maintain the pump in the desired position. A first ring gasket 7 is in a sealed chamber 5 and a second ring gasket 8 is applied to the shaft 3 and adheres to the first gasket 7 in the sealed chamber 5. When the gaskets 7, 8 are stuck or adhered together, all parts of the pump are fixed in stable position one to another, thereby leading to the failure to start as described above.

Initial movement between the rotor 2 and the stator 1 so that one or the other rotates with respect to the other, despite the temporary sticking of the gaskets 7, 8 to each other, allows the moving part to accumulate inertia and discharge the inertia against the sticking gaskets 7, 8 to unstick the gaskets 7, 8. The initial movement between the rotor 2 and stator 1 is obtained by building the frame in reciprocally mobile first and second frame parts 4/1, 4/2. The first frame part 4/1 includes the sealed chamber 5 and is equipped with holes 30, or Other known means of attachment, to fix the first frame part 4/1 to the structure that supports the pump. The second frame part 4/2 is rigidly fixed to the stator 1 and can rock with respect to the structure that supports the first frame part 4/1.

It is evident that the first and second frame parts 4/1, 4/2 rotate reciprocally around the drive-shaft 3 which constitutes a pivot point between two different assemblies. The first assembly includes the disk wheel 6, the first and second gaskets 7, 8, the sealed chamber 5, the rotor 2, the drive-shaft 3, and the first frame part 4/1. The second assembly includes the stator 1 and the second frame part 4/2.

The first assembly is rigidly blocked against rotation because of the sticking between the gaskets 7, 8, whereas the second assembly rotates freely on the drive shaft 3.

The second frame part 4/2 is equipped with an external appendage A, while the first frame part 4/1 is equipped with a corresponding external appendage B. The appendages are positioned and sized to make it possible for them to interfere with each other in a given position that corresponds to a certain arc or angle of rotation of the second assembly.

When the motor is initially powered, instead of turning the rotor 2, and hence the drive-shaft 3, the stator 1 is made to rotate together with the second frame part 4/2. The stator 1 and the second frame part 4/2 rotate over a small rotational arc, permitted by the fact that the second assembly is able to rock, to a point where the appendages A, B meet and interfere with each other. The contact between the appendages A, B causes inertia accumulated by the stator 1 to be transferred to the rotor 2. The rotor 2 transmits the inertial impulse through the drive-shaft 3 to the second ring gasket 8 which imposes a frictional force between the gaskets 7, 8. It is evident that if a mass of the stator 1 combined with an angular velocity attained by the stator 1 at the moment of impact of the appendages is sufficient, enough torque is produced to unstick the gaskets 7, 8.

Figure 2:
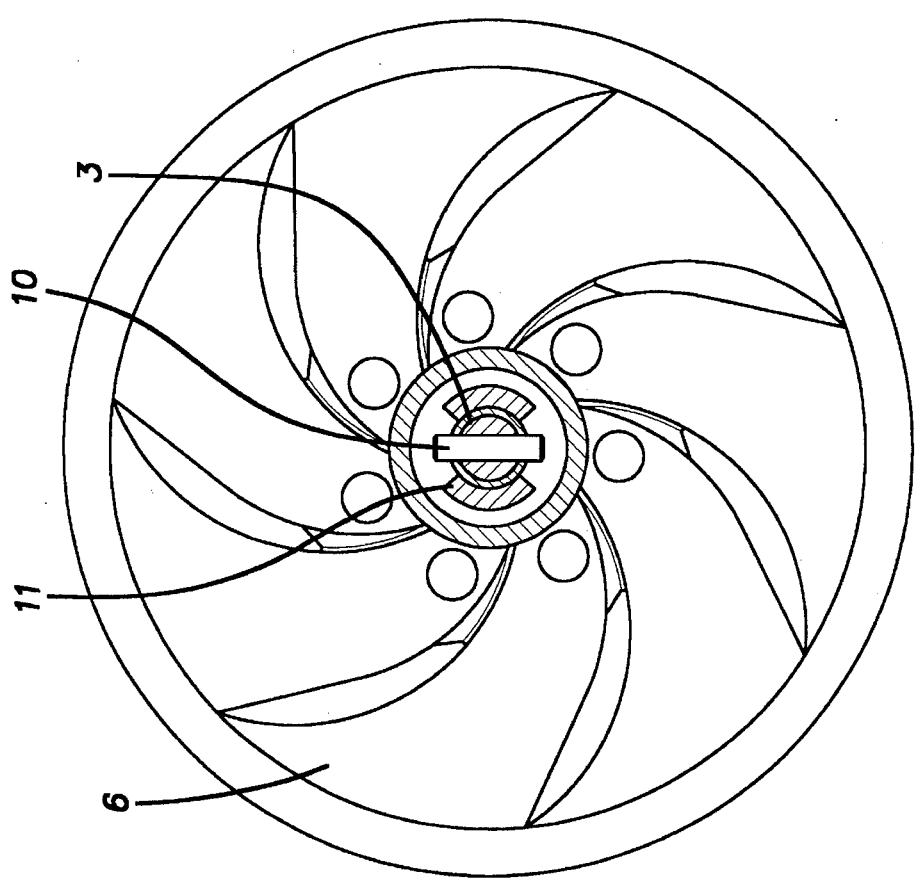

A second embodiment of the invention is shown in FIGS. 2 and 2a. A head end of the drive-shaft 3 has a pin 10 housed by the disk wheel 6. The pin 10 is located in a hole in the drive-shaft 3 transverse to the axis of rotation of the drive-shaft 3. Ends of the pin 10 protrude on both sides of the drive-shaft. The disk wheel 6 has two corresponding grooves 11 on opposite sides of the drive-shaft 3 to house the ends of pin 10.

The grooves 11 are of a size such that the drive-shaft 3 can rotate over a certain arc before the pin 10 encounters terminal walls of the grooves 11. Thus there is a limited uncoupling in the rotation between the drive-shaft 3 and the disk wheel 6 to which are fixed the gaskets 7, 8 that stick to each other.

To start rotation of the rotor 2 it is necessary that the drive-shaft 3 initially be positioned such that the pin 10 is in the grooves 11 opposite to that of normal operation. To position the drive-shaft 3 in this manner, the motor is preferably powered with suitable polarities to cause the rotor 2 to turn in a direction opposite to a direction of rotation of normal operation for a brief period of time. As a consequence, the rotor 2 will place itself in the extreme backward position allowed by the grooves 11. When power is subsequently applied with polarities for normal operation, the rotor 2 will be able to turn for the brief but sufficient distance allowed by the length of the grooves 11 to accumulate inertia necessary to unstick the gaskets 7, 8 when the pin 10 contacts the terminal walls of the grooves 11.

A third embodiment of the invention is shown in FIGS. 3, 3a, 3b, and 3c in which a generally ring-shaped pawl 31 is fixed to the drive-shaft 3. The pawl 31 has at least one protuberance 32 and is positioned so that the protuberance 32 can act on side borders of at least one arc-shaped relief 33 arranged stably around a hole through which passes the drive-shaft 3 fixed to the disk wheel.

In addition, as best illustrated in FIGS. 3c, the drive-shaft 3 is not rigidly connected to the rotor 2. The drive-shaft 3 has a diameter that is less than a diameter of an internal hole of the rotor 2 and is supported within the hole by one or more little collars fixed in the hole. The arrangement of the pawl 31 and the reliefs 33 and their size relationships to one another are such that the drive-shaft 3 rotates freely with respect to the rotor 2, at least over a certain arc.

The partial rotation of the drive-shaft with respect to the disk wheel is allowed by the dimensions of the protuberances 32 of the pawl 31 which move over the certain arc before coming into contact with the side borders of relief 33. The motor is started by initially rotating the rotor 2 in a reverse direction as allowed by the interference between the pawl 31 and the reliefs 33 as described above in the description of the second embodiment of the invention.

A fourth embodiment of the invention is shown in FIGS. 4 and 4a, which is conceptually similar to the second embodiment of the invention shown in FIGS. 2 and 2a. Two pins 41, 42 are set axially on a flat surface of the rotor 2 facing toward the disk wheel. A cooling fan 46 fixed to the drive-shaft 3 has corresponding recesses 44, 45 which are of suitable spacing and size between radial ribs of the cooling fan 46 for the pins 41, 42 to extend into the recess 44, 45. The pins 41, 42 and the recesses 44, 45 are positioned and sized to allow partial rotation of the rotor 2 relative to the cooling fan 46 and drive-shaft over a certain arc to a point at which the pins 41, 42 interferes with the radial ribs of the cooling fan 46.

The motor is started by initially rotating the rotor 2 backward to the point permitted by interference between the pins 41, 42 and the radial ribs of the cooling fan 46, in the same manner as explained above.

Figure 5:
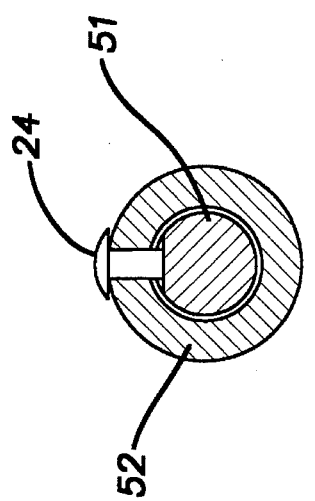
Figure 5A:
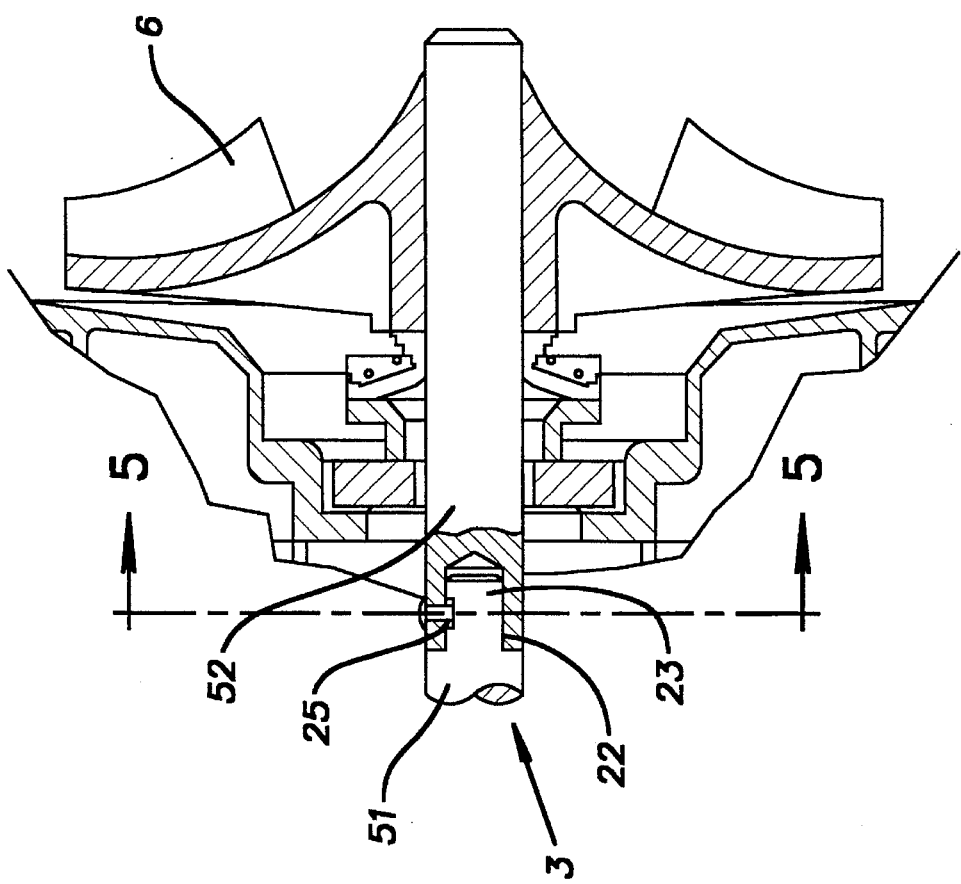
FIG. 5a is a fragmented longitudinal elevational view, in cross sectional, of a motor-driven pump according to a fifth embodiment the invention.

A fifth embodiment of the invention is shown in FIGS. 5 and 5a where the initial rotation is obtained by separating the drive-shaft 3 into first and second segments 51, 52. The first segment 51 is rigidly connected to the rotor and the second segment 52 is rigidly connected to the disk wheel 6. The two shaft segments 51, 52 are coupled by a recess 22 on one of the segments, a corresponding prolongation 23 on the other of the segments that fits into the recess 22, and pin 24 which engages both of the segments 51, 52.

A short length of the prolongation 23 has a crescent shape in cross-section to form a seat 25 for the pin 24. The prolongation 23 and the seat 25 are positioned and shaped to allow partial rotation of the shaft segments 51, 52 relative to each other over a certain arc to a point at which the pin 24 interferes with a surface of the seat 25.

The motor is started by initially rotating the rotor 2 backward to the point permitted by interference between the pin 24 and the seat 25, in the same manner as explained above.

Although particular embodiments of the invention have been described in detail, it will be understood that the invention is not limited correspondingly in scope, but includes all changes and modifications coming within the spirit and terms of the claims appended hereto.

What is claimed is:

1. A motor-driven pump having an electric motor, said motor-driven pump comprising a stator, a rotor for cooperating with said stator, a drive-shaft joined to said rotor for rotation with said rotor, a disk wheel joined to a free head of said drive-shaft for rotation with said drive-shaft, a first ring gasket encircling said drive-shaft, and a second ring gasket fixed to said disk wheel and engaging said first ring gasket, said first and second ring gaskets being engaged on sides orthogonal to said drive-shaft, and means for uncoupling said disk wheel from said rotor so that said rotor and said stator rotate reciprocally and freely relative to one another over an initial arc before driving torque is applied to said second ring gasket, wherein said drive-shaft is formed and placed so as to allow a partial initial rotation of the rotor with respect to the disk wheel, said motor being operable to turn the rotor in a direction opposite a direction of rotation of normal operation for a brief period of time after which the rotor is turned in the direction of rotation of normal operation.

2. A motor driven-pump as in claim 1, wherein said uncoupling means includes a pin joined to said drive-shaft adjacent said disk wheel and transverse to an axis of said drive-shaft, said pin having at least one end protruding from said drive-shaft, and at least one arc-shaped groove formed in said disk wheel to receive a portion of said pin, said pin and said groove allowing free rotation of said drive-shaft with respect to said disk wheel over said initial arc.

3. A motor driven pump as in claim 1, wherein said uncoupling means includes a pawl joined to said drive-shaft and having at least one protuberance adjacent said free head of the drive-shaft, and at least one relief formed in said rotor near a hole for the drive-shaft, said protuberance and said relief allowing free rotation of said drive-shaft with respect to said rotor over said initial arc.

4. A motor-driven pump as per claim 1, further comprising a cooling fan fixed to said drive shaft, and wherein said uncoupling means includes at least one recess formed in said cooling fan adjacent said rotor, and at least one pin protruding from said rotor and into said recess, said pin and said recess allowing free rotation of said drive-shaft with respect to said cooling fan over said initial arc.

5. A motor-driven pump as per claim 1, wherein said drive-shaft includes a first segment joined to said rotor and a second segment joined to said disk wheel, and said uncoupling means includes a coupling between said first and second segments having a recess on one of the segments and a corresponding prolongation on the other of the segments that fits into said recess, said prolongation having a seat generally crescent shaped in cross-section to receive an inner end of a pin passing into said recess through a wall of said recess, said seat and said pin being sized and positioned to allow free rotation of said first segment with respect to said second segment over said initial arc.

\* \* \* \* \*